(12) United States Patent
McCarty

(10) Patent No.: US 7,073,269 B2
(45) Date of Patent: Jul. 11, 2006

(54) SELF-LEVELING LASER ALIGNMENT TOOL AND METHOD THEREOF

(75) Inventor: Robin McCarty, Fairborn, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/968,205

(22) Filed: Oct. 19, 2004

(65) Prior Publication Data

US 2006/0080849 A1    Apr. 20, 2006

(51) Int. Cl.
*G01C 5/02* (2006.01)
*G01C 15/00* (2006.01)
*G01C 15/10* (2006.01)

(52) U.S. Cl. .............................. 33/286; 33/391; 33/402; 33/DIG. 1

(58) Field of Classification Search .................. 33/286, 33/290, 291, 391–402, DIG. 1, DIG. 21
See application file for complete search history.

(56) References Cited

U.S. PATENT DOCUMENTS

| 3,771,876 A | 11/1973 | Ljungdahl et al. |
| 3,935,643 A * | 2/1976 | Russell et al. ................ 33/312 |
| 4,679,937 A | 7/1987 | Cain et al. |
| 4,801,791 A | 1/1989 | Cain |
| 4,852,265 A | 8/1989 | Rando et al. |
| 4,912,851 A * | 4/1990 | Rando et al. .......... 33/DIG. 21 |
| 5,144,487 A | 9/1992 | Hersey |
| 5,257,279 A | 10/1993 | Dugan et al. |
| 5,459,932 A | 10/1995 | Rando et al. |
| 5,541,727 A | 7/1996 | Rando et al. |
| 5,619,802 A | 4/1997 | Rando et al. |
| 5,917,587 A | 6/1999 | Rando |
| 6,028,665 A * | 2/2000 | McQueen .................... 33/286 |
| 6,043,879 A * | 3/2000 | Dong .......................... 33/291 |
| 6,384,913 B1 | 5/2002 | Douglas et al. |
| 6,563,646 B1 | 5/2003 | Litvin |
| 6,688,011 B1 * | 2/2004 | Gamal et al. ................ 33/290 |
| 6,792,685 B1 * | 9/2004 | Ng et al. ..................... 33/286 |
| 2003/0229997 A1 * | 12/2003 | Gamal et al. ................ 33/290 |
| 2004/0172836 A1 * | 9/2004 | Ng et al. ..................... 33/286 |
| 2005/0016005 A1 * | 1/2005 | Voecks ........................ 33/344 |
| 2005/0193577 A1 * | 9/2005 | Sergyeyenko et al. ........ 33/290 |

FOREIGN PATENT DOCUMENTS

| EP | 0 670 468 A1 | 9/1995 |
| GB | 835 810 A | 5/1960 |

* cited by examiner

Primary Examiner—G. Bradley Bennett
(74) Attorney, Agent, or Firm—Dinsmore & Shohl LLP

(57) ABSTRACT

A self-leveling laser alignment tool and method thereof which provides a laser beam in a substantially truly level or plumb orientation are disclosed. Magnetic attraction is used to compensate for leveling errors of an approximately or partially leveled pendulum platform that is suspended from a flexible suspension element having a predetermined material stiffness. The material stiffness of the suspension element is compensated by using a magnet which pulls the pendulum platform into an orientation that is substantially truly level and plumb.

36 Claims, 1 Drawing Sheet

SELF-LEVELING LASER ALIGNMENT TOOL AND METHOD THEREOF

BACKGROUND OF THE INVENTION

This invention relates to laser alignment tools, and in particular to a self-leveling laser alignment tool and method which compensates for material stiffness of a pendulum suspension system.

A variety of survey and carpentry tools have previously employed lasers to improve accuracy and reliability of leveling. To further improve the accuracy of such laser alignment tools, there are several methods to automatically self-level either the laser or a reflective surface within the laser alignment tool.

In one general category of automatic self-leveling, a pendulum suspension system is used to level the laser by gravity. In one pendulum suspension system example, the laser or reflective surface is suspended by a ball bearing pivot within a housing. However, at tilt angles close to level the force available to overcome the friction in the ball bearings is quite small, leading to inaccuracy.

In another pendulum suspension system example, the laser or reflective surface is hung by a flexible support member, such as a thread, a wire or a coil spring. Threads, however, provide little if any torsion resistance, thereby leading to line orientation difficulties. Additionally, at tilt angles, material stiffness (i.e., bending, strain, deflection) of the wire or coil spring although small, does not allow the pendulum suspension system to hang truly plumb, thereby also leading to inaccuracy.

Accordingly, there is a need for a leveling technique which compensates for material stiffness in a pendulum suspension system of a laser alignment tool.

SUMMARY OF THE INVENTION

The present invention provides a substantially level and plumb pendulum platform of a laser alignment tool in two stages. In a first stage, the pendulum platform with a large self-leveling range is deflected under the weight of its mass. In a second stage, final tilt correction is provided through magnetic attraction. Magnetic attraction between a magnet and a pendulum platform overcomes the material stiffness of the pendulum suspension element, which would otherwise prevent the platform from achieving a truly level and plumb state.

In one embodiment, a laser source and optics are mounted on the pendulum platform. The pendulum platform is very close to level because of the relatively low material stiffness of the pendulum suspension element. The remaining relatively small tilt dependent errors are corrected by magnetic attraction between a magnet mounted to a housing of the laser alignment tool and a ferrous material provided on the pendulum platform. The magnet provides an approximately radially regionally linear force due to a magnetic field which influences the ferrous material when the platform is tilted as a result of the housing being tilted and the distance between the ferrous material and the magnet decreases which in turn increases the radial attraction force on the ferrous material. Accordingly, the magnetic attraction between the ferrous material and magnet tends to compensate for the material stiffness of the pendulum suspension element by pulling the platform in a position that is substantially truly level and plumb.

In another embodiment, provided is a self-leveling method which compensates for material stiffness in a pendulum suspension system of a laser alignment tool. The method comprises supporting a platform from a pendulum suspension element having a predetermined material stiffness. The platform has a large self-leveling range via mass weight. The method further includes providing final tilt correction through magnetic attraction between a magnet and the pendulum platform which overcomes the predetermined material stiffness of the pendulum suspension element to position the platform in a substantially truly plumb and level state.

In another embodiment, provided is a self-leveling method which compensates for material stiffness in a pendulum suspension system of a laser alignment tool. The method comprises providing a platform, and supporting the platform from a pendulum suspension element having a predetermined material stiffness. The platform has a large self-leveling range via mass weight. The method further includes providing a magnetically attractive material on the pendulum platform, situating the magnetically attractive material above a magnet such that as the platform is tilted as a result of the housing being tilted, a radial attractive force between the material and the magnet in the direction of tilt increases, thereby compensating for the predetermined material stiffness of the pendulum suspension element and pulling the platform in an orientation that is substantially truly level and plumb.

In still another embodiment, provided is a self-leveling laser alignment tool which provides a laser beam in a substantially truly level or plumb orientation. The apparatus comprises a housing, and a pendulum platform secured to the housing and depending internally in the housing via a pendulum suspension element for effecting a first stage of alignment when the housing is not truly level or plumb, leaving a residual angle of deviation of the laser beam from the truly level and plumb orientation. The apparatus further includes a magnetically attractive material provided on the pendulum platform, and a magnet mounted to the housing and below to the material such that as the platform is tilted as a result of the housing being tilted, a radial attractive force between the material and the magnet increases, thereby effecting a second stage of alignment by compensating for material stiffness of the pendulum support element and pulling the platform in an orientation that is substantially truly level and plumb.

These and other features and advantages of the invention will be more fully understood from the following description of the various embodiments of the invention taken together with the accompanying drawing. It is noted that the scope of the claims is defined by the recitations therein, and not by the specific discussion of features and advantages set forth in the present description.

BRIEF DESCRIPTION OF THE DRAWINGS

The organization and manner of operation of the invention, together with further objects and advantages thereof, may best be understood by reference to the following description taken in connection with the accompanying drawing in which.

DETAILED DESCRIPTION OF THE VARIOUS EMBODIMENTS

Figure 1:
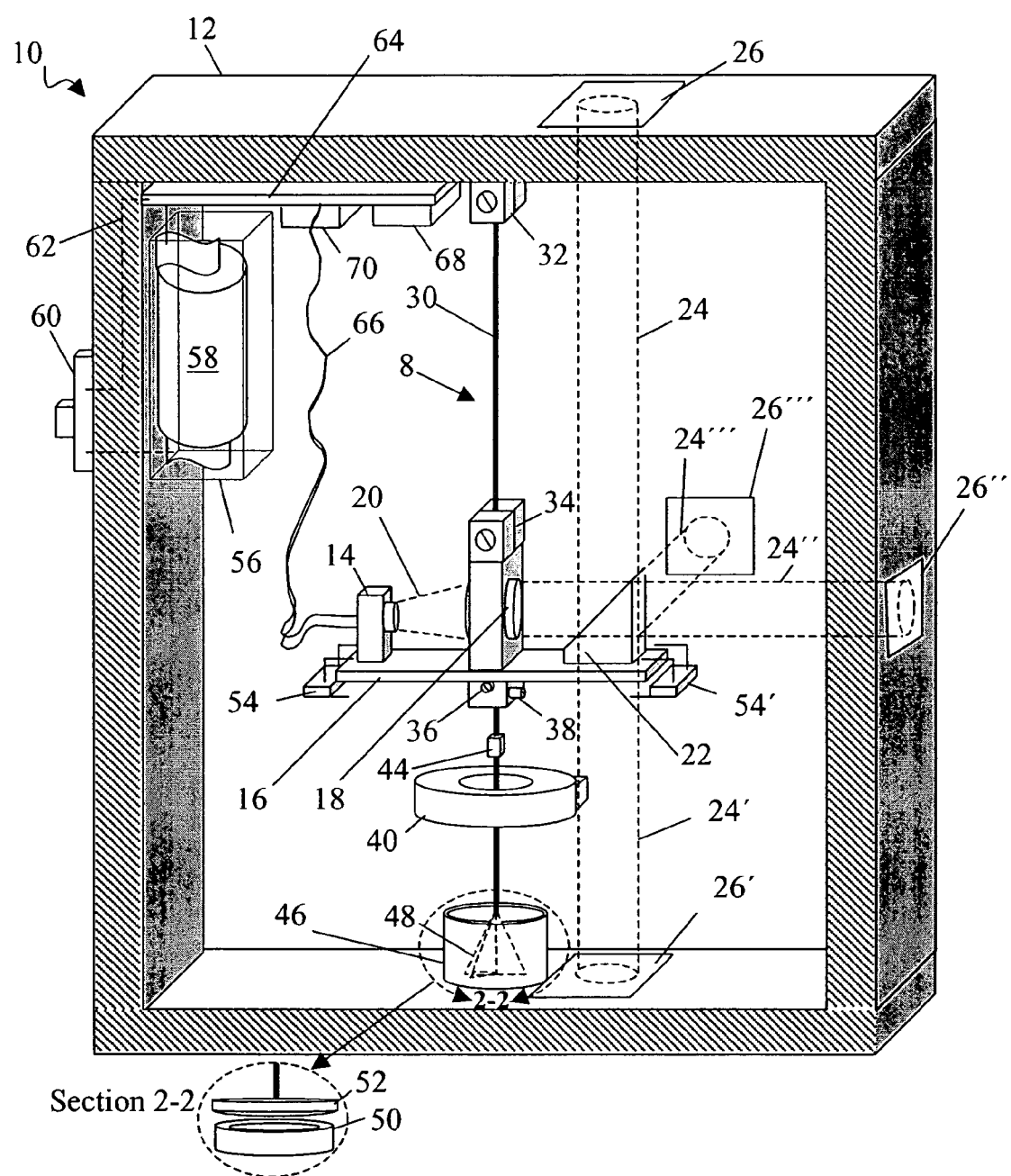
FIG. 1 is a partial section view of a self-leveling laser alignment tool having a laser source hanging by a pendulum suspension element according to one embodiment of the present invention.

While the invention may be susceptible to embodiment in different forms, there is shown in the drawing, and herein will be described in detail, specific embodiments with the understanding that the present disclosure is to be considered an exemplification of the principles of the invention, and is not intended to limit the invention to that as illustrated and described herein.

Skilled artisans appreciate that elements in the drawing are illustrated for simplicity and clarity and have not necessarily been drawn to scale. For example, the dimensions of some of the elements in the drawing may be exaggerated relative to other elements to help to improve the understanding of the various embodiments of the present invention.

FIG. 1 shows generally one illustrative embodiment of a self-leveling laser alignment tool 10, used to provide a laser beam in a truly plumb or level state. The tool 10 has a housing 12, which is partially cut-away to show an internally housed pendulum suspension system, generally indicated as symbol 8, of the tool 10. As depicted, a visible laser source 14 is mounted on a pendulous pendulum platform 16 of the pendulum suspension system 8. The diverging laser beam 20 generated by the laser source 14 working in conjunction with lens 18 provides a convergent focus at a predetermined distance.

In the illustrated embodiment, the emerging light beam 20 is partially reflected by an optic 22 splitting the beam into upwardly and downwardly directed beam 24, 24' and a pair of orthogonal horizontal beams 24" and 24'". It is to be appreciated in other embodiments, that optic 22 may also be of the type which produces three orthogonal horizontal beams and two vertical beams (one up and one down), such as the type disclosed by U.S. Pat. No. 6,563,646 to Litvin, commonly own by Trimble Navigation Limited (Sunnyvale, Calif.), of which the disclosure is incorporated fully by reference.

In still other embodiments, the emerging beam 20 may be reflected from a surface to cause a desired beam orientation with or without an included beam splitter. Exit windows 26, 26', 26" and 26'" are provided for the level, plumb and square beams. It is to be appreciated that weak lens, typically used in prior art device for final tilt compensation, are not needed due to the compensation method of the present invention explained hereafter.

The pendulum platform 16 hangs by a pendulum suspension element 30, such as a single wire, coil spring(s) or any other element that flexes and has sufficient torsional stiffness to substantially minimize torsional rotation (i.e., side-to-side twisting about the pendulum support element 30) and whose material stiffness (i.e., properties related to bending, strain, deflection) is such that it allows the pendulum platform 16 to hang very nearly plumb when the tool 10 is tilted. In one example, the pendulum platform 16 weighs approximately 26 grams, and the pendulum suspension element 30 is a 20.9 mm long, 0.18 mm diameter wire. Such an arrangement is sufficiently weak to allow the pendulum platform 16 to hang under the force of gravity to approximately 98% of true plumb within a housing tilt range of ±5°.

The pendulum suspension element 30 is fastened at the top to the housing 12 by clamp 32 and at the bottom to the pendulum platform 16 by clamp 34. Adjustment screws 36 and 38 are provided to calibrate the pendulum platform 16, and hence the beams 24, 24', 24", and 24'" to a level and plumb orientation. As known, turning the screws 36 and 38 finely adjusts the location of the center of gravity of the pendulum suspension system 8, thus redirecting the beams 24, 24', 24" and 24'". There are other well known methods of shifting the location of the center of gravity of a pendulum, such as selectively adding or subtracting weight.

Final tilt compensation of the pendulum platform 16 is provided by a permanent ring magnet 40, which corrects for the slight lack of a truly plumb and level orientation caused by the material stiffness of the pendulum suspension element 30. In one embodiment, this final tilt compensation is sufficient to correct approximately 2% error due to the material stiffness in the pendulum suspension element 30. When the tool 10 is tilted, ring magnet 40 compensates for the material stiffness of the pendulum suspension element 30 by pulling the pendulum platform 16 to a substantially plumb and/or level orientation. The final orientation of the pendulum platform 16 by this method is accurate to within about ±30 arcseconds of truly plumb and level.

A magnetically attractive material, such as a ferrous member 44, is used to pull the pendulum platform 16 into the substantially truly plumb and level orientation. As depicted, the ferrous member 44 is aligned centrally above the ring magnet 40. The ring magnet 40 provides a magnetic field that when placed below ferrous member provides an approximately radially regionally linear force. Accordingly, as the housing 12 is tilted, an attractive force between the magnetically attractive material 44 and the magnet 40 in the direction of the tilt increases, thereby effecting a final or second stage of alignment by compensating for material stiffness of the pendulum suspension element 30 and pulling the platform 16 in an orientation that is substantially truly level and plumb.

In an experimental embodiment, values disclosing final tilt compensation by the present invention are disclosed and compared by Table 1 (no magnetically assisted compensation) and Table 2 (magnetically assisted compensation). For the experimental embodiment used to compile the data of Tables 1 and 2, an 0.821 inch (20.85 mm) length of music wire having a 0.007 inch (0.18 mm) diameter supported a pendulum platform below a support frame, forming a support constrained pendulum suspension system. The pendulum platform weighed 25.7856 grams. A ferrous member having a 0.13 inch (3.30 mm) diameter was suspended from a bottom surface of the pendulum platform and located centrally 0.298 of an inch (7.57 mm) above a ring magnet. The ring magnetic provided a magnetic field having a residual B field value of about 3.8 kG. The ring magnet is so situated to provide a radial magnetic field which compensates for tilt along the N-S Axis (pitch) and the E-W axis (roll). A damping pool was provided below the ring magnet to influence a portion of the pendulum platform and dampen any pendulous oscillation.

In Tables 1 and 2, Pitch (minutes) and Roll (minutes) are the pitch and roll of the frame from true horizontal, and Total Δ (arcsecs) is the total vertical alignment from true level or plumb.

TABLE 1

(No magnetically assisted compensation).

| Pitch (minutes) | Total Δ (arcsecs) |
|---|---|
| 0 | 0 |
| 34 | −30 |
| 68 | −62 |
| 102 | −93 |
| 136 | −123 |
| 170 | −154 |
| 204 | −183 |
| 238 | −214 |
| 272 | −244 |
| 306 | −275 |
| 0 | 0 |
| −34 | 31 |
| −68 | 59 |

TABLE 1-continued (No magnetically assisted compensation).

| | Total Δ (arcsecs) |
|---|---|
| −102 | 97 |
| −136 | 120 |
| 0 | 0 |
| Roll (minutes) | |
| 0 | 0 |
| −34 | 2 |
| −68 | 5 |
| −102 | 10 |
| −136 | 14 |
| 0 | 0 |
| 34 | −5 |
| 68 | −10 |
| 102 | −9 |
| 136 | −14 |
| 0 | 0 |

TABLE 2

(Magnetically assisted compensation).

| | Total Δ (arcsecs) |
|---|---|
| Pitch (minutes) | |
| 0 | 0 |
| 34 | −3 |
| 68 | −8 |
| 102 | −10 |
| 136 | −11 |
| 170 | −10 |
| 204 | −9 |
| 238 | −9 |
| 272 | −8 |
| 306 | −4 |
| 0 | 0 |
| −34 | 2 |
| −68 | 4 |
| −102 | 8 |
| −136 | 12 |
| 0 | 0 |
| Roll (minutes) | |
| 0 | 0 |
| −34 | 4 |
| −68 | 8 |
| −102 | 13 |
| −136 | 18 |
| 0 | 0 |
| 34 | −3 |
| 68 | −7 |
| 102 | −11 |
| 136 | −14 |
| 0 | 0 |

As disclosed by Tables 1 and 2, the experimental embodiment having the radial magnet significantly compensated the pendulum suspension system in the pitch range from −2.27° to 5.1°, wherein the pitch errors were shown to be in the range of −11 to 12 arcseconds as compared to −275 to 120 arcseconds for the uncompensated pendulum suspension system in the same pitch range.

It is to be appreciated that varying the material stiffness of the support wire, i.e. changing its diameter, geometric shape, and length will result in varying degrees of final error correction, as will changing the mass of the pendulum suspension system, the magnetic moment of the ring magnet, and the location of the magnetically attractive member in relation to the ring magnet. In particular, the parameters and their selection for a particular range of final error correction can be determined with the following differential equations:

$$r_f \cdot \beta = \frac{\partial U}{\partial Q_y} = K_1 + K_2 + K_3 + K_4 + K_5 + K_6, \text{ where:}$$

$$K_1 = \frac{1}{EI} \int_{A_1}^{B_1} M_{s1} \frac{\partial M_{s1}}{\partial Q_y} \cdot \frac{r}{\cos(\psi)} d\theta +$$
$$\frac{1}{EI} \int_{A_2}^{B_2} M_{sM} \frac{\partial M_{sM}}{\partial Q_y} \cdot \frac{r_0}{\cos(\psi_0)} d\theta + \frac{1}{EI} \int_{A_3}^{B_3} M_{s2} \frac{\partial M_{s2}}{\partial Q_y} \cdot \frac{r}{\cos(\psi)} d\theta$$

$$K_2 = \frac{1}{EI} \int_{A_1}^{B_1} M_{n1} \frac{\partial M_{n1}}{\partial Q_y} \cdot \frac{r}{\cos(\psi)} d\theta + \frac{1}{EI} \int_{A_2}^{B_2} M_{nM} \frac{\partial M_{nM}}{\partial Q_y} \cdot \frac{r_0}{\cos(\psi_0)} d\theta +$$
$$\frac{1}{EI} \int_{A_3}^{B_3} M_{n2} \frac{\partial M_{n2}}{\partial Q_y} \cdot \frac{r}{\cos(\psi)} d\theta$$

$$K_3 = \frac{1}{GJ} \int_{A_1}^{B_1} M_{t1} \frac{\partial M_{t1}}{\partial Q_y} \cdot \frac{r}{\cos(\psi)} d\theta + \frac{1}{GJ} \int_{A_2}^{B_2} M_{tM} \frac{\partial M_{tM}}{\partial Q_y} \cdot \frac{r_0}{\cos(\psi_0)} d\theta +$$
$$\frac{1}{GJ} \int_{A_3}^{B_3} M_{t2} \frac{\partial M_{t2}}{\partial Q_y} \cdot \frac{r}{\cos(\psi)} d\theta$$

$$K_4 = \frac{1}{EA} \int_{A_1}^{B_1} F_{t1} \frac{\partial F_{t1}}{\partial Q_y} \cdot \frac{r}{\cos(\psi)} d\theta + \frac{1}{EA} \int_{A_2}^{B_2} F_{tM} \frac{\partial F_{tM}}{\partial Q_y} \cdot \frac{r_0}{\cos(\psi_0)} d\theta +$$
$$\frac{1}{EA} \int_{A_3}^{B_3} F_{t2} \frac{\partial F_{t2}}{\partial Q_y} \cdot \frac{r}{\cos(\psi)} d\theta$$

$$K_5 = \frac{1}{GA} \int_{A_1}^{B_1} F_{n1} \frac{\partial F_{n1}}{\partial Q_y} \cdot \frac{r}{\cos(\psi)} d\theta + \frac{1}{GA} \int_{A_2}^{B_2} F_{nM} \frac{\partial F_{nM}}{\partial Q_y} \cdot \frac{r_0}{\cos(\psi_0)} d\theta +$$
$$\frac{1}{GA} \int_{A_3}^{B_3} F_{n2} \frac{\partial F_{n2}}{\partial Q_y} \cdot \frac{r}{\cos(\psi)} d\theta$$

$$K_6 = \frac{1}{GA} \int_{A_1}^{B_1} F_{n1} \frac{\partial F_{n1}}{\partial Q_y} \cdot \frac{r}{\cos(\psi)} d\theta +$$
$$\frac{1}{GA} \int_{A_2}^{B_2} F_{nM} \frac{\partial F_{nM}}{\partial Q_y} \cdot \frac{r_0}{\cos(\psi_0)} d\theta + \frac{1}{GA} \int_{A_3}^{B_3} F_{n2} \frac{\partial F_{n2}}{\partial Q_y} \cdot \frac{r}{\cos(\psi)} d\theta$$

and where $r_f$ was the radius of curvature for the arc that $Q_y$ travels through. $Q_y$ is the lateral force on the end of the suspension element due to the mass of the pendulum platform when the housing is tilted. U is the strain energy associated with the system. The variables n, s, and t represent a local coordinate system associated with the spring geometry. $M_i$ and $F_i$ represents the moments and forces applied to the spring in the local coordinate system. The variables r, and ψ represent the geometry of the spring.

To dampen the oscillation of the pendulum suspension system 8, in one embodiment a damping pool 46 is provided within the housing below the pendulum platform 16. The damping pool 46 contains a viscous fluid, such as mineral oil, which interacts with a fin 48 suspended from the pendulum platform 16. In another embodiment illustrated by the cut-away of section 2—2, eddy current braking may be used to also dampen the pendulous oscillation of the pendulum platform 16 as known in the art. Magnet(s) 50 may be positioned close to a damping member 52 supported from the pendulum platform 16 for this purpose.

Mechanical stops 54 and 54' are provided to limit the motion of the pendulum suspension system 8 and to protect the pendulum suspension element 30 and clamps 32 and 34 from damage due to mechanical shocks, while allowing a range of tilt compensation, such as for example ±5° in each direction. Stops 54 and 54' are positioned close to the center of gravity of the pendulum platform 16 to minimize shock induced rotation. Stops 54 and 54' also restrain up/down motion of the pendulum platform 16 to prevent damage to the pendulum suspension element 30 from unwanted upward/downward motion of the pendulum platform.

A battery compartment 56 holds a battery 58 in place in the housing 12 by a spring at the rear and a spring at the front. A switch 60 controls the flow of current to a lead 62 supplying power to a circuit board 64. The components of the circuit board 64 have been omitted to reduce the complexity of the drawing. The circuit board 64 is mounted to the housing 12 and drives the laser source 14, such as a diode, using electrical leads 66. The pendulum suspension element 30 may be used as one of these leads, connected to the circuit board by a lead. The electrical leads 66 are fine copper or gold wires which convey power to the laser source 14. The diameter of the electrical leads 66 is less than 25 microns to avoid any mechanical forces which might influence the pendulum suspension system 8. In addition, the length of the electrical leads 66 is relatively long to reduce the effect of any mechanical forces which do exist.

Although the circuit board 64 has been depicted as being mounted to the housing, in other embodiments, the circuit board 64 may be mounted to the pendulum platform 16. Additionally, in other embodiments it is also to be appreciated that either the laser source 14 or the optical elements 18 and 20 (together or separately) may be hung from the pendulum platform 30, with the remaining optical parts mounted to the housing 12.

In still another embodiment, the permanent ring magnet 40 may be replaced with a solenoid type coil which is electrically coupled to the circuit board 64 and powered by the battery 58. In one such embodiment, the tool 10 further includes a tilt sensor 68 providing sensor data to the circuit board 64. This allows for the magnetic field to vary as a function of current and therefore the compensation from the solenoid magnet can be altered. Accordingly, the circuit board 64 can be adapted to adjust for perfect compensation using as input the tilt angle sensed by the tilt sensor 68 to regulate current flowing from the battery 58 through at least one of a plurality of coils provided in the solenoid magnet. In another embodiment, a thermistor 70 is included and electrically coupled to the circuit board 64 such that the current of the solenoid coil can be adjusted to correct for any error caused by temperature variation.

The above described embodiments are intended to illustrate the principles of the invention, not to limit its scope. Other embodiments in variations to these preferred embodiments will be apparent to those skilled in the art and may be made without departing from the spirit and scope of the invention as defined in the following claims.

What is claimed is:

1. A self-leveling method which compensates for material stiffness in a pendulum suspension system of a laser alignment tool, said method comprising:
   supporting a platform from a pendulum suspension element having a predetermined material stiffness, said platform having a large self-leveling range via mass weight;
   providing final tilt correction through magnetic attraction between a magnet and a magnetically attractive material which overcomes said predetermined material stiffness of the pendulum suspension element to position said platform in a substantially plumb state.

2. The method of claim 1 wherein said magnet provides an approximately radially regionally linear force due to a magnetic field below said magnetically attractive material.

3. The method of claim 1 wherein said pendulum platform provides said magnetically attractive material positioned to be attracted to said magnet.

4. The method of claim 1 wherein said pendulum suspension element is a material selected from the group consisting of wires, springs, and combinations thereof.

5. The method of claim 1 wherein said magnet is a permanent ring magnet situated below said pendulum platform and providing an approximately radially regionally linear force due to a magnetic field that attracts said magnetically attractive material supported by said pendulum suspension element.

6. The method of claim 1 further comprising supporting a laser source with said platform.

7. The method of claim 1 further comprising supporting optics with said platform.

8. The method of claim 1 further comprising supporting at least one reflective surface with said platform.

9. The method of claim 1 further comprising damping pendulum oscillation of said platform.

10. The method of claim 1 wherein said self-leveling range is to about 98% of true plumb for a tilt range from a true horizon of about ±5°.

11. The method of claim 1 wherein said final tilt correction is to correct a plumb error up to about 2% form true plumb.

12. The method of claim 1 wherein said magnet is a solenoid coil type.

13. A self-leveling method which compensates for material stiffness in a pendulum suspension system of a laser alignment tool providing a laser beam, said method comprising:
   providing a platform;
   supporting said platform from a pendulum suspension element having a predetermined material stiffness, said platform having a large self-leveling range via mass weight;
   providing a magnetically attractive material on said pendulum platform;
   situating said magnetically attractive material adjacent to a magnet such that as said platform is tilted, an attractive force between said material and said magnet increases, thereby compensating for said material stiffness of said pendulum suspension element and pulling said platform in an orientation that is substantially truly level and plumb.

14. The method of claim 13 wherein said magnet provides an approximately radially regionally linear force due to a magnetic field below said pendulum platform.

15. The method of claim 13 wherein said pendulum suspension element is a material selected from the group consisting of wires, springs, and combinations thereof.

16. The method of claim 13 further comprising supporting a laser source with said platform, said laser source generating the laser beam.

17. The method of claim 13 further comprising supporting optics with said platform in the path of the laser beam.

18. The method of claim 13 further comprising supporting at least one reflective surface with said platform.

19. The method of claim 13 wherein said magnet is a permanent ring magnet situated below said pendulum platform and providing an approximately radially regionally linear force due to a magnetic field that attracts said magnetically attractive material supported by said pendulum suspension element.

20. The compensating method of claim 13 further comprising damping pendulum oscillation of said platform.

21. The method of claim 13 wherein said self-leveling range is to about 98% of true plumb for a tilt range from a true horizon of about ±5°.

22. The method of claim 13 wherein said final tilt correction is to correct a plumb error up to about 2% from true plumb.

23. The method of claim 13 wherein said magnet is a solenoid type and said method further comprises increasing/decreasing magnetic field strength of said magnet in the direction of said tilt.

24. The method of claim 13 further comprises sensing said tilt and increasing/decreasing magnetic field strength of said magnet based on said sensed tilt.

25. The method of claim 13 further comprises sensing said tilt, sensing temperature, and increasing/decreasing magnetic field strength of said magnet based on said sensed tilt and temperature.

26. A self-leveling laser alignment tool which provides a laser beam in a substantially truly level or plumb orientation, said apparatus comprising:
   a housing;
   a pendulum platform secured to the housing and depending internally in the housing via a pendulum suspension element for effecting a first stage of alignment when the housing is not truly level or plumb, leaving a residual angle of deviation of the laser beam from a truly level or plumb orientation;
   a magnetically attractive material support by said pendulum platform; and
   a magnet mounted to said housing and below said material such that as said platform is tilted, an attractive force between said material and said magnet increases, thereby effecting a second stage of alignment by compensating for material stiffness of said pendulum support element and pulling said platform in an orientation that is substantially truly level or plumb.

27. The apparatus of claim 26 wherein said magnet provides an approximately radially regionally linear force due to a magnetic field below said pendulum support element.

28. The apparatus of claim 26 wherein said pendulum suspension element is a material selected from the group consisting of wires, springs, and combinations thereof.

29. The apparatus of claim 26 wherein said platform includes a laser source which generates the laser beam.

30. The apparatus of claim 26 wherein said platform includes optics in the path of the laser beam.

31. The apparatus of claim 26 wherein said platform includes at least one reflective surface situated in the path of the laser beam.

32. The apparatus of claim 26 wherein said magnet is selected from the group consisting of permanent magnets and solenoid type magnets.

33. The apparatus of claim 26 further comprising a damping member influencing said pendulum platform to dampen pendulous oscillation of said platform.

34. The apparatus of claim 26 wherein said self-leveling range is to about 98% of true plumb for a tilt range from a true horizon of about ±5°.

35. The apparatus of claim 26 wherein said final tilt correction is to correct a plumb error up to about 2% from true plumb.

36. The apparatus of claim 26 wherein said magnet comprises a plurality of solenoid coils, and said apparatus further comprises a tilt sensor, a circuit board electrically coupled to said plurality of solenoid coils and said tilt sensor, and a power supply powering said tilt sensor, said circuit board and said plurality of solenoid coils, where said circuit board is adapted to regulate an amount of current from said battery to flow through at least one of said plurality of solenoid coils based on a tilt angle sensed by said tilt sensor.

* * * * *

UNITED STATES PATENT AND TRADEMARK OFFICE
CERTIFICATE OF CORRECTION

PATENT NO. : 7,073,269 B2 Page 1 of 1
APPLICATION NO. : 10/968205
DATED : July 11, 2006
INVENTOR(S) : Robin McCarty It is certified that error appears in the above-identified patent and that said Letters Patent is hereby corrected as shown below:

Col. 8, line 26 "form" should read --from--.

Signed and Sealed this

Twenty-first Day of November, 2006

JON W. DUDAS
*Director of the United States Patent and Trademark Office*